Aug. 21, 1934.                S. E. EVANS                1,970,741
JACK POST STRUCTURE
Filed March 13, 1930
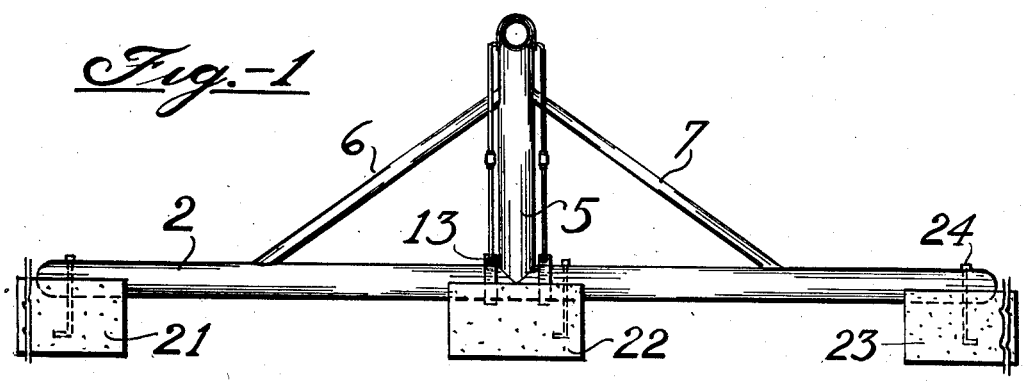
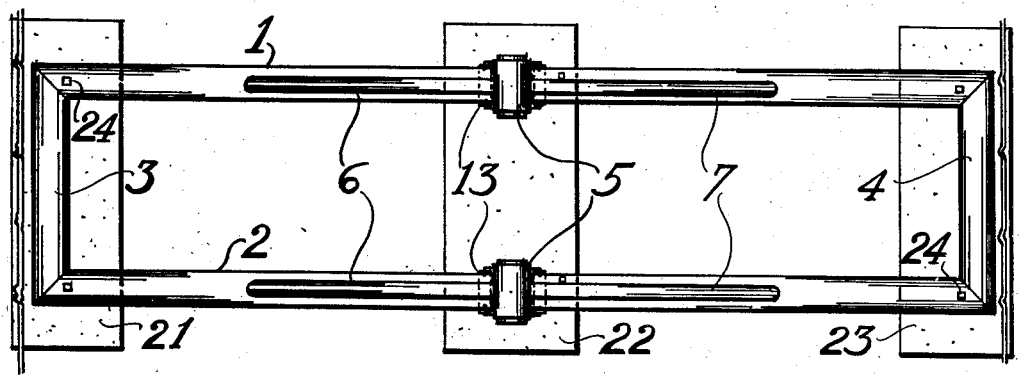
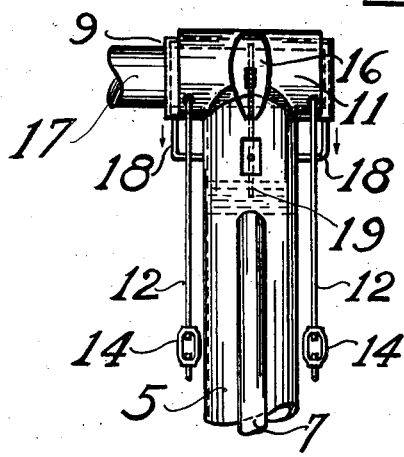
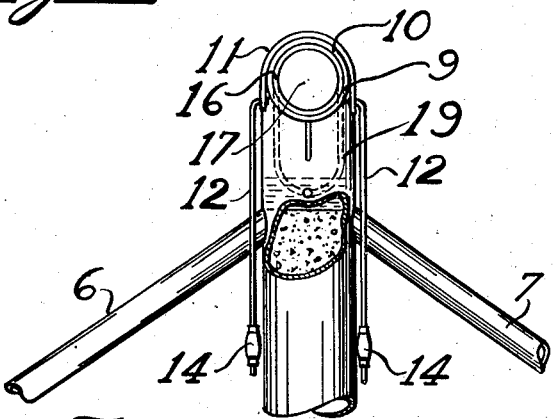
INVENTOR.
Silas E. Evans
BY
W. E. Currie
ATTORNEY.

Patented Aug. 21, 1934

1,970,741

UNITED STATES PATENT OFFICE 1,970,741

JACK POST STRUCTURE

Silas E. Evans, Bristow, Okla., assignor to Standard Oil Development Company, a corporation of Delaware Application March 13, 1930, Serial No. 435,441

1 Claim. (Cl. 189—16)

This invention relates to improvements in foundations for rigs used in drilling and pumping wells and is more particularly directed to improvements in jack post structure. The invention will be fully understood from the following description taken in connection with the accompanying drawing in which Fig. 1 is a side elevation of the improved construction;

Fig. 2 is a top plan view thereof;

Fig. 3 is a detail view in side elevation of the upper portion of the jack post; and Fig. 4 is a similar detail in front elevation.

In the drawing, the base of the jack post is shown as formed of a frame comprising two elongated pipe sections 1 and 2 having beveled ends which are connected by two pipe sections 3 and 4. The connections are made by welding the pipe sections together or by any other type of permanent connection such as brazing. A tubular upright 5 extends from each pipe section 1 and 2 intermediate their ends. The uprights are secured to the pipe sections by welding or by other suitable form of permanent connection. The uprights are braced by means of tubular brackets 6 and 7 which extend from opposite sides of the upper portion of each upright to pipe sections 1 and 2. A bearing housing section 9 is permanently secured as by welding to each upright. Removable bearing housings 10 co-operate with the housing sections 9 and are secured in position by means of a split casing 11. Split casing 11 is held against the bearing housing sections by means of rods 12 which are secured to bands 13 which encircle the pipe sections 1 and 2 of the base. Turnbuckles 14 are provided to tighten the connection. The bearing housings contain suitable bearings 16 and a shaft 17 is rotatably disposed in the bearings. Concrete is disposed in the uprights leaving a space which constitutes a reservoir for lubricant in the upper portion of the uprights. Pipes 18 communicate with the bearing housings adjacent their ends and communicate with the reservoir to drain lubricant from the housings. Oiling chains 19 are associated with the bearings and depend into the reservoirs. The jack post structure is anchored to blocks of concrete 21, 22 and 23 by means of anchor bolts 24 which project downwardly from the base.

In the preferred embodiment, the base is constructed of 8¼ inch pipe which is cut and welded to form a frame approximately 20 feet long by approximately 5 feet wide. The tubular uprights are welded to approximately the middle of the frame and are braced by 4 inch pipe braces which are approximately 6 feet 4 inches long and extend from near the upper portion of the tubular upright to the base at an angle of approximately 45 degrees. The lower halves of the bearing housing are approximately 6 inches in diameter and are securely welded to the ends of the uprights.

The jack post construction described is unitary and its parts cannot become loosened and out of alignment during use. In assembling the structure it can be leveled and the anchor bolts hung in position after which the concrete can be run to embed the anchor bolts and embrace the base. It is contemplated to form the base of oval or other shape which will present an enlarged surface to the ground.

Various changes and alternative arrangements may be made within the scope of the appended claim, in which it is my intention to claim all novelty inherent in the invention as broadly as the prior art permits.

I claim:

In a jack post structure comprising an elongated base formed of a frame having side pieces of tubing and end pieces of tubing extending between and permanently secured to the side pieces, the improvement which comprises a pair of upstanding tubular posts directly and permanently secured to the side pieces at an intermediate point thereon, a pair of tubular braces, secured to each post, extending laterally and downwardly from opposite sides thereof to a permanent connection with the side pieces at points intermediate the posts and the ends of the side pieces, and a stiffening filler of a solidified plastic material within each post extending upwardly from the base thereof and terminating in spaced relationship to the tops of the posts to form integral lubricant reservoirs therein for supplying lubricant to bearings to be supported by the posts.

SILAS E. EVANS.